United States Patent [19]
Jow et al.

[11] Patent Number: 5,600,535
[45] Date of Patent: Feb. 4, 1997

[54] AMORPHOUS THIN FILM ELECTRODE MATERIALS FROM HYDROUS METAL OXIDES

[75] Inventors: T. Richard Jow, Chatham; Jian-Ping Zheng, Eatontown, both of N.J.

[73] Assignee: The United States of America as represented by the Secretary of the Army, Washington, D.C.

[21] Appl. No.: 353,418

[22] Filed: Dec. 9, 1994

[51] Int. Cl.⁶ .............................. H01G 9/00; H01G 9/04; H01G 9/042

[52] U.S. Cl. .................. 361/503; 361/548; 361/516; 29/25.03

[58] Field of Search ........................ 361/503, 528, 361/529, 504, 516; 204/290 F; 205/505; 427/314, 318, 376.3, 376.4, 419.1; 29/25.03

[56] References Cited

U.S. PATENT DOCUMENTS

| | | | |
|---|---|---|---|
| 3,718,551 | 2/1973 | Martinsons | 204/98 |
| 3,853,739 | 12/1974 | Kolb et al. | 204/290 |
| 5,369,547 | 11/1994 | Evans | 361/516 |

*Primary Examiner*—Leo P. Picard
*Assistant Examiner*—Anthony Dinkins
*Attorney, Agent, or Firm*—Michael Zelenka; William H. Anderson

[57] ABSTRACT

This invention relates to a novel electrode material for electrochemical (EC) capacitors. This invention also relates to a novel method for making such electrode. The electrode material is an amorphous phase of ruthenium oxide formed directly on titanium (Ti) substrate. The method is the application of heat on the Ti substrate which is wetted by metal alkoxide precursor. The method produces film which adheres to the substrate before and after charge/discharge cycling. As a result, the EC capacitors made of the electrode exhibit high power and also high energy which is higher than that of the traditional crystalline phase of ruthenium oxide thin film on Ti. This type of capacitor is especially suited for burst communication which requires energy with high power density, high energy density, and high cycle life at medium to low voltages (10–20 volts).

3 Claims, 5 Drawing Sheets

10

AMORPHOUS THIN FILM ELECTRODE MATERIALS FROM HYDROUS METAL OXIDES

GOVERNMENT INTEREST

The invention described herein may be made, used, sold, and/or licensed by, or on behalf of, the Government of the United States of America without the payment to us of any royalty thereon.

RELATED APPLICATIONS

This application is related to a previously filed application entitled "Electrode Materials for Electrochemical Capacitors from Hydrous Ruthenium Oxide, Other Hydrous Metal Oxides, and Hydrous Mixed Metal Oxides and Method of Preparation of Such Materials", by J. P. Zheng and T. R. Jow, filed on Apr. 21, 1994, assigned Ser. No. 8/232,901, and having an attorney docket number of CECOM 5018.

FIELD OF THE INVENTION

This invention relates to electrode materials for electrochemical (EC) capacitors and batteries. More particularly, this invention relates to electrode materials comprised of hydrous metal oxides and metal oxides of an amorphous phase coated on metal substrates or on carbon powders. This invention also relates to a method for the preparation of amorphous hydrous metal oxides and metal oxides coated on metal substrates or on carbon powders.

BACKGROUND OF THE INVENTION

It is generally accepted that the origin of the pseudocapacitance for ruthenium oxide is due to the fast proton reaction with the oxide species at the surface. Therefore, the surface area of the thin film determines the charge storage capability of the film. For high rate operation, it is desirable to have thin film electrodes to maximize the surface area. It is also desirable to have the thin film fabricated directly on the metal substrate to minimize the resistance between the active material and the current collector. Furthermore, it is necessary to have the adhesion remain for many charge/discharge cycles.

Heretofore, $RuO_2$, has been fabricated by the thermal decomposition of ruthenium chloride or hydrous ruthenium chloride. $RuO_2$, like other dioxides of the platinum group, e.g. $RhO_2$, $OsO_2$, and $IrO_2$, exhibits metallic conductivity and possesses a rutile structure. The pseudocapacitance, which arises at the $RuO_2$ and the electrolyte interface, is due to the facile ionic species absorption on the surface of the $RuO_2$ electrode material.

In order to maximize the charge or energy storage per unit weight of oxides in this type of system, it is desirable to maximize the surface area of the electrode material. A maximum BET surface area of 130 $m^2$/gram was achieved by Raistrick for optimized processing. The observed capacitance per unit mass (F/g) and the observed capacitance per unit area (F/cm$^2$), which are determined from the measured electrochemical capacitance, the measured surface area, and the known amount of $RuO_2$ present in the electrode, are 380 F/g and 200–300 $\mu F/cm^2$, respectively, in a 1 V range in sulfuric acid electrolyte. Based on the assumption that one H may be adsorbed on each exposed atom, a charge density of 200 $\mu C/cm^2$ is estimated by Raistrick. This suggests that the observed capacitance 380 F/g is the maximum value that can be achieved for $RuO_2$.

When thin films of ruthenium oxide are thermally decomposed to form an electrode, they are usually thermally decomposed directly onto a titanium (Ti) substrate. Films formed in this manner adhere to the Ti substrate, but they have a crystalline phase. The crystalline phase of the material inhibits the maximum charge that can be stored with the thin film. Accordingly, there is a need in this art to maximize the storage capacity of thin films formed on metals. The present invention addresses this need.

References which are relevant to the present invention include the following: Can. Pat. No. 1,196,683 issued in 1985 to Craig; U.S. Pat. No. 2,800,616 issued in 1957 to Becker; U.S. Pat. No. 3,536,963 issued in 1970 to Boos; Conway, Journal of the Electrochemical Society, vol. 138, pp. 1539–15, 1991; Raistrick, Proceedings of First Conference on Capacitors and Similar Energy Storage Devices, Deerfield Beach, Fla., Dec. 9–11, 1991, Ansum Enterprises Inc., Boca Raton, Fla.; U.S. Pat. No. 5,003,428, issued to Shepherd on Mar. 26, 1991; I. Raistrick in "The Electrochemistry of Semiconductors and Electronics—Process and Devices", p.297, ed. J. McHardy and F. Ludig, Noyes, N.J. (1992); and H. B. Sierra Alcazar, K. A. Kern, G. E. Mason, and R. Tong, Proc. 33rd Inter. Power Sources Symposium, Cherry Hill, N.J., 13–16 Jun. 1988.

SUMMARY OF THE INVENTION

Accordingly, one objective of this invention is to enhance the current delivering capability (or power density) of the active electrode materials such as hydrous metal oxides and metal oxides by coating a thin layer of these materials on a metal substrate used as a current collector or on carbon powder.

Another objective of this invention is to provide a method of coating these active materials on substrates with good adhesion.

Another objective of this invention is to prevent metal oxides from becoming crystalline to produce a maximum storage density.

The amorphous film electrodes according to the preferred embodiment of the present invention are prepared by a sol-gel process using a transition metal (such as ruthenium) alkoxide precursor in organic solvents. Then, conductive substrates are coated with the precursor and annealed at temperatures that will not cause a crystalline phase to occur. The amorphous metal oxide according to the present invention provides charge storage capacity greater than 430 F/g and a rate shorter than 4 seconds for one full charge/discharge cycle with 95% utilization over a 1 V range in sulfuric acid electrolyte.

This invention also includes a method of preparing a thin film wherein a sol-gel process is used to form a metal alkoxide precursor in nonaqueous solvents.

The aqueous sol-gel process disclosed in the Related Application can be used to prepare ruthenium oxide having an amorphous phase in the powder form. However, the maximum charge that can be stored in the crystalline phase of ruthenium oxide is only half of that of amorphous ruthenium oxide. This is because the film formed by drying the aqueous sol solution on Ti does not adhere to the Ti substrate upon cycling. Accordingly, one of the purposes of this invention is to describe a new method for preparing amorphous ruthenium oxide thin film that will adhere and remain adhered to the metal substrates after cycling. Another purpose of this invention is to apply this new method to prepare amorphous metal oxides on carbon for the enhancement of the rate of the utilization of the active material. As a result, the resistance between the active electrode material and the current collector will be minimized and the adhesion of the thin film will remain strong after many high rate charge/discharge operations.

Further, this invention provides a method to coat these active oxides on carbon without the oxidation of carbon so as to achieve the necessary adhesion and high current capabilities.

Furthermore, this invention also provides a capacitor incorporating the electrode material of this invention. The capacitor includes:

(1) an anode (a negative electrode) comprising amorphous phase of thin film ruthenium oxide or mixed metal oxides on Ti or other metals, (2) an electrolyte comprising sulfuric acid of various concentration or other aqueous electrolytes, and (3) a cathode (a positive electrode) comprising amorphous thin film ruthenium oxide or other mixed metal oxides on Ti or other metals.

It has been discovered that capacitors having electrodes comprised of amorphous ruthenium oxide thin film on Ti exhibit higher power and higher charge storage than electrodes having a crystalline phase.

DESCRIPTION OF DRAWINGS

These and other objects of the present invention will become apparent from the Detailed Description of the Invention and the attached drawings wherein.

DETAILED DESCRIPTION OF THE PREFERRED EMBODIMENTS

Figure 1:
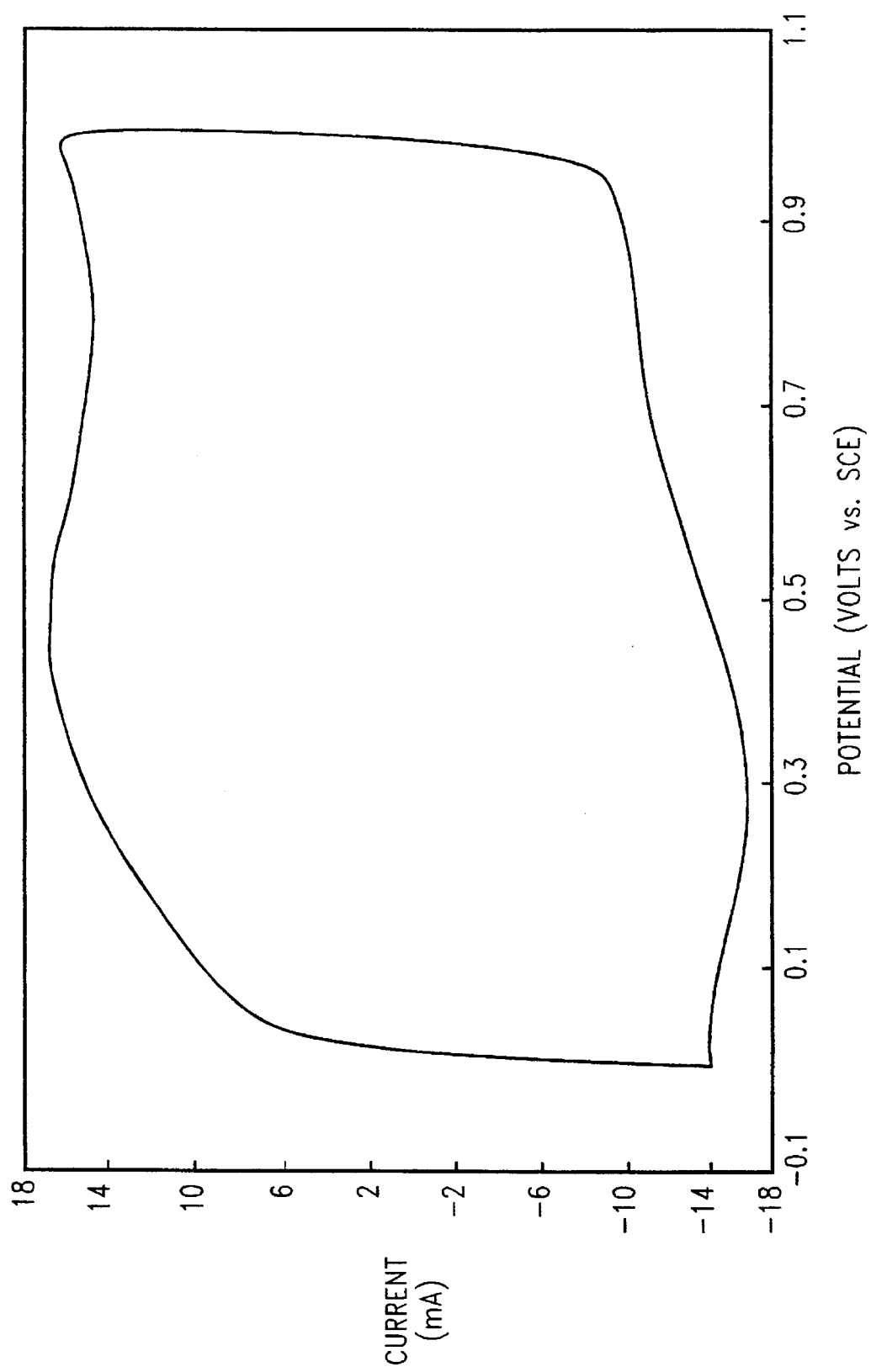
FIG. 1 is a cyclic voltammogram of a film electrode in 0.5 mol $H_2SO_4$ electrolyte at a voltage scan rate of 50 mV/sec, wherein the electrode was made from ruthenium ethoxide solution, was annealed at an temperature of 100 ° C., and had a size and weight of approximately 1.6×2.0 $cm^2$ and 0.60 mg, respectively.

The electrode material of this invention is comprised of an amorphous phase of a thin film of metal oxide, for example ruthenium oxide, which is coated on an electrically conductive substrate, such as titanium or a carbonaceous material.

Ruthenium oxide films are usually prepared by thermal decomposition and oxidation of soluble precursor materials at high temperatures (300°–500° C.). The most common precursor is $RuCl_3.xH_2O$, dissolved in water. However, because $RuCl_3$ can only be thermally decomposed at high temperatures (>300° C.), a crystalline phase of ruthenium oxide is formed and thus, the porosity of the film decreases with increasing the temperature. In this invention, a novel approach is used to make an amorphous phase of ruthenium oxide film electrode at low temperatures so as to maximize the storage density of the electrode material. The specific capacitance and the porosity of the electrode are higher than those of ruthenium oxide made at high temperatures with conventional methods.

Sample Preparation

The amorphous $RuO_2$ film electrodes according to the preferred embodiment of the present invention are prepared by a sol-gel process using ruthenium alkoxide precursor in organic solvents. The process is described as follows: The required amount of $RuCl_3.xH_2O$ is dissolved in ethanol or methanol or 2-propanal. At the same time, sodium alkoxide (e.g. sodium ethoxide, sodium methoxide and sodium propoxide) is dissolved in ethanol or methanol or 2-proponal, respectively, and is added slowly into the $RuCl_3.xH_2O$ solution with the solvent of ethanol, methanol, or 2-proponal. Then, the mixed solution is heated to the boiling temperature for 10–30 minutes. During mixing and heating processes, the solution is constantly stirred by a magnetic stirring bar. The mixed solution is then cooled down to room temperature. At this point, the ruthenium alkoxide solution is formed and is ready for coating film electrodes. The ruthenium alkoxide solutions should be black in color when the process is completed.

In the preferred embodiment, titanium (Ti) foils are used as substrates, although other metals as well as carbonaceous materials may be used. Ti substrates are first cleaned with acetone, methanol and distilled water before being etched by a mixed acid solution (19% by weight of $HNO_3$ and 1% by weight of HF in water). The foils are etched to provide a rough surface, which is washed with distilled water again to provide a clean etched surface.

In one embodiment of the invention, the amorphous $RuO_2$ film electrodes are prepared by a dip coating technique. As many as 5–15 coats are applied onto the substrate. After each coating, the film is annealed at 100° to 450 ° C. for about 15 minutes, is dipped into boiled water for about 1–3 minutes and then, is dried at 100° C. before the next coating.

One critical aspect of this process is to provide the proper amount of sodium alkoxide which is added into ruthenium chloride solution. If too much sodium alkoxide is added, then precipitation occurs leaving no ruthenium alkoxide in the solution. If too little sodium alkoxide is added, then the film does not adhere to the substrate. Once formed, the film is easily washed out after annealing it at a temperature below 300° C.

Another important aspect of the present invention is to keep the solution within a pH value between 3 to 6. The surface treatment of substrates is also important in order to make high quality film electrodes. It was found that with substrates etched with acid solution, films were more porous and adhered to the substrates much better than those films coated on substrates that were not surface treated. Of course, those skilled in the art will recognize that other means are available to roughen the surface of a substrate, for example sanding or sand blasting the substrate.

The procedure, for washing the film in boiled water after the film was coated and was annealed, is also an important and necessary step. Without washing the film with boiling water, sodium is detected in the film by energy dispersive spectroscopy. However, after washing with boiling water, the sodium is removed and cannot be found in the film.

In another embodiment, the ruthenium alkoxide solution is prepared from anhydrous $RuCl_3$ powders instead of $RuCl_3 \cdot xH_2O$ powders. However, because anhydrous $RuCl_3$ powders are insoluble in solvents of ethanol or methanol or 2-proponal, the procedure for preparation of the ruthenium alkoxide is different from the procedure mentioned above. Instead of mixing solutions of $RuCl_3 \cdot xH_2O$ and sodium alkoxide, $RuCl_3$ powders are added directly into the sodium alkoxide solution. The $RuCl_3$ reacts with sodium alkoxide to form ruthenium alkoxide and NaCl. The ruthenium alkoxide is soluble in the solvent and NaCl precipitates in the solvent after stirring stops.

It should be noted that the film electrode may be made by several different coating techniques from the ruthenium alkoxide solutions. These techniques include dip coating, spray coating, brush painting, etc. Those skilled in the art are familiar with these and similar techniques and accordingly, would be able to form a thin film according to the present invention with any similar technique.

Crystalline Structure and Surface morphology

The crystalline structure of the thin film electrodes formed according to the present invention was investigated by an x-ray diffractometer. Within a $2\theta$ range from 20° to 60°, no diffraction peaks were present for films annealed at temperatures lower than 200° C., except for three sharp peaks at about 38°, 40° and 53° that corresponded to the Ti substrate. However, for the films made at annealing temperatures higher than 200° C., diffraction peaks corresponding to anhydrous $RuO_2$ could be observed. The peak intensity increased with the annealing temperature. These results indicate that at low annealing temperatures, amorphous films were formed, but at annealing temperatures higher than 200° C., crystalline $RuO_2$ started to form.

The surface morphology of these film electrodes was studied by a scanning electron microscopy (SEM) and was compared with those film electrodes made from the traditional aqueous solution as described in prior art. It was found that the films made with the ruthenium alkoxide solution were much more porous than those made from the aqueous solution. It was seen from SEM pictures, the films contained fine particles contacted together of size on order of several microns.

Electrochemical Properties

Figure 2:
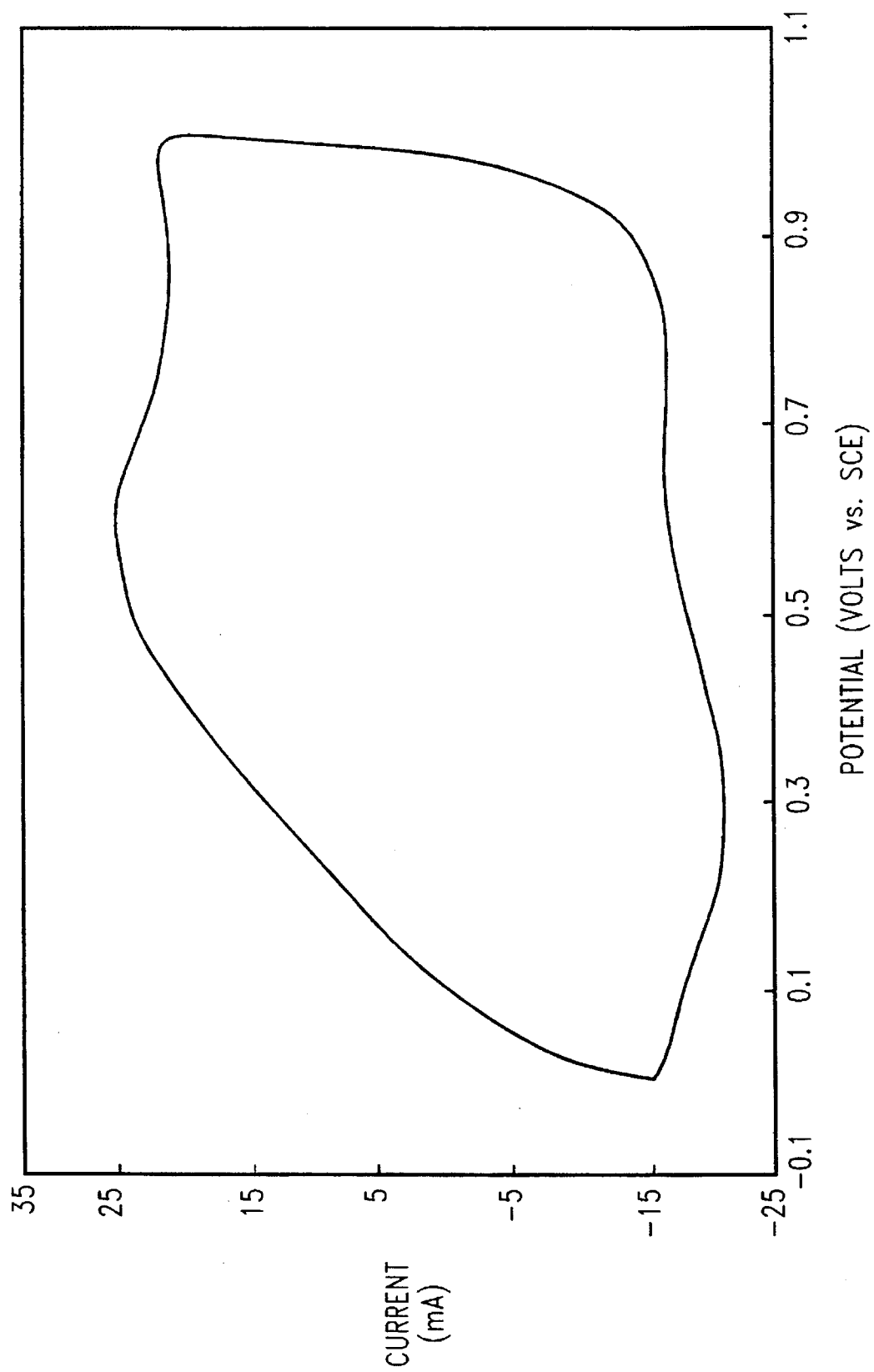
FIG. 2 is a cyclic voltammogram of a film electrode made from ruthenium methoxide solution and annealed at 100 ° C., wherein voltage scan rate was 50 mV/sec and the weight of the film electrode was 1.06 mg.
Figure 3:
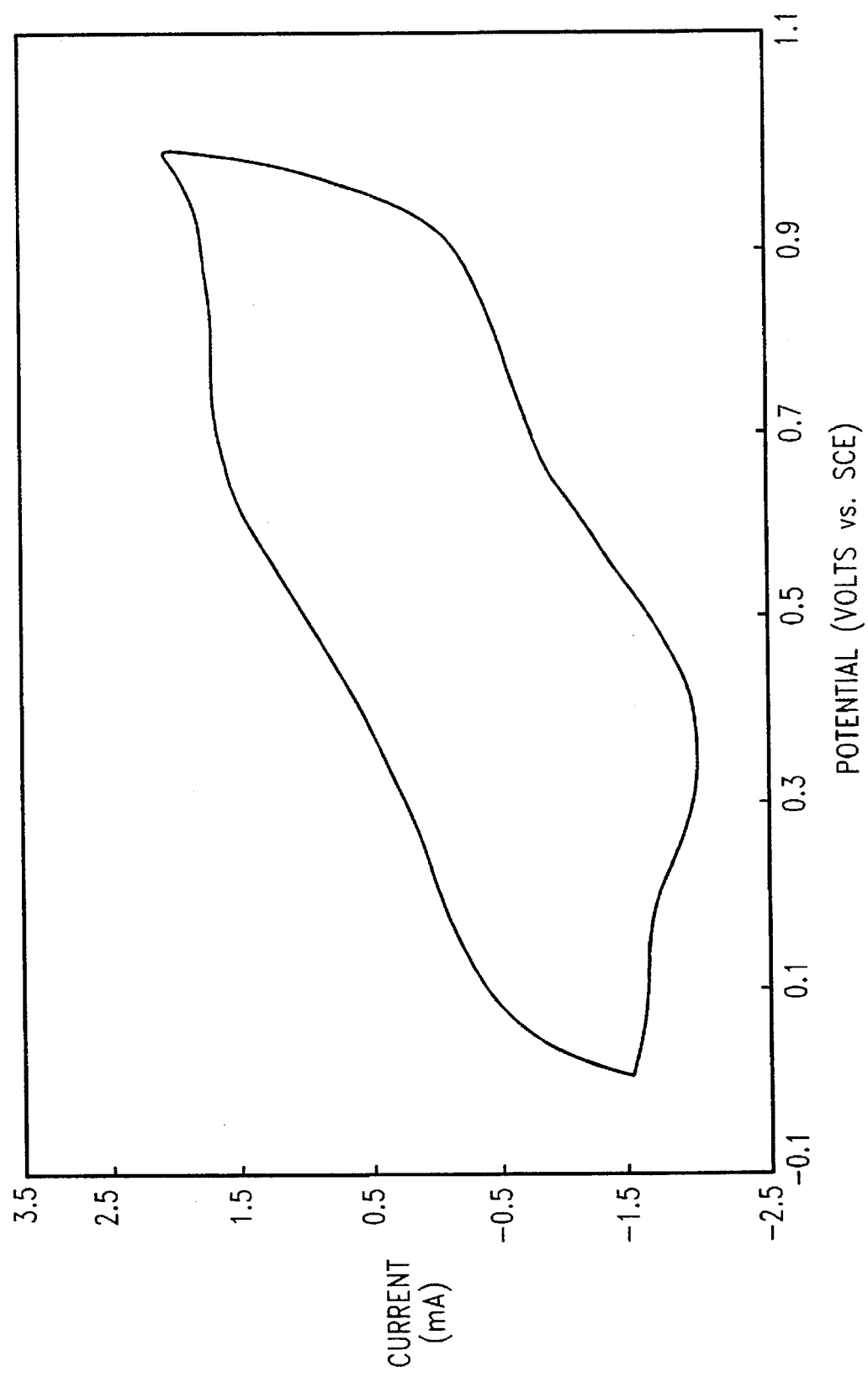
FIG. 3 is a cyclic voltammogram of a film electrode made from ruthenium propoxide solution and annealed at 100 ° C., wherein the voltage scan rate was 50 mV/sec and the weight of the film electrode was 0.25 mg.

The electrochemical properties of these film electrodes were studied by cyclic voltammetry (CV). The Ti substrate coated with amorphous ruthenium oxide film was a working electrode. A platinum grid was used as a counter electrode and the reference electrode was a saturated calomel electrode (SCE). FIG. 1 shows a CV curve of an electrode in 0.5 mol $H_2SO_4$ electrolyte at a voltage scan rate of 50 mV/sec. The electrode was made from ruthenium ethoxide precursor in ethanol and was annealed at an temperature of 100° C. The size of electrode was about 1.6×2.0 cm² and the weight of the film electrode was 0.6 mg. The specific capacitance of the electrode was calculated based on CV curves. An average specific capacitance as high as 430 F/g was obtained in the potential range of 0–1 volt vs. SCE. It can be seen that the current response in the CV curve is nearly constant and is symmetrical with the potential. Similar CV characteristics were obtained on electrodes made from ruthenium methoxide in methanol (FIG. 2) and from ruthenium propoxide in 2-proponal (FIG. 3). Table I shows the summarized results of the average specific capacitance measured from electrodes made from different ruthenium alkoxide solutions.

TABLE I

| Precursor ruthenium ethoxide | ruthenium methoxide | ruthenium propoxide |
|---|---|---|
| Specific capacitance (F/g) | | |
| 430 | 316 | 88 |

Figure 4:
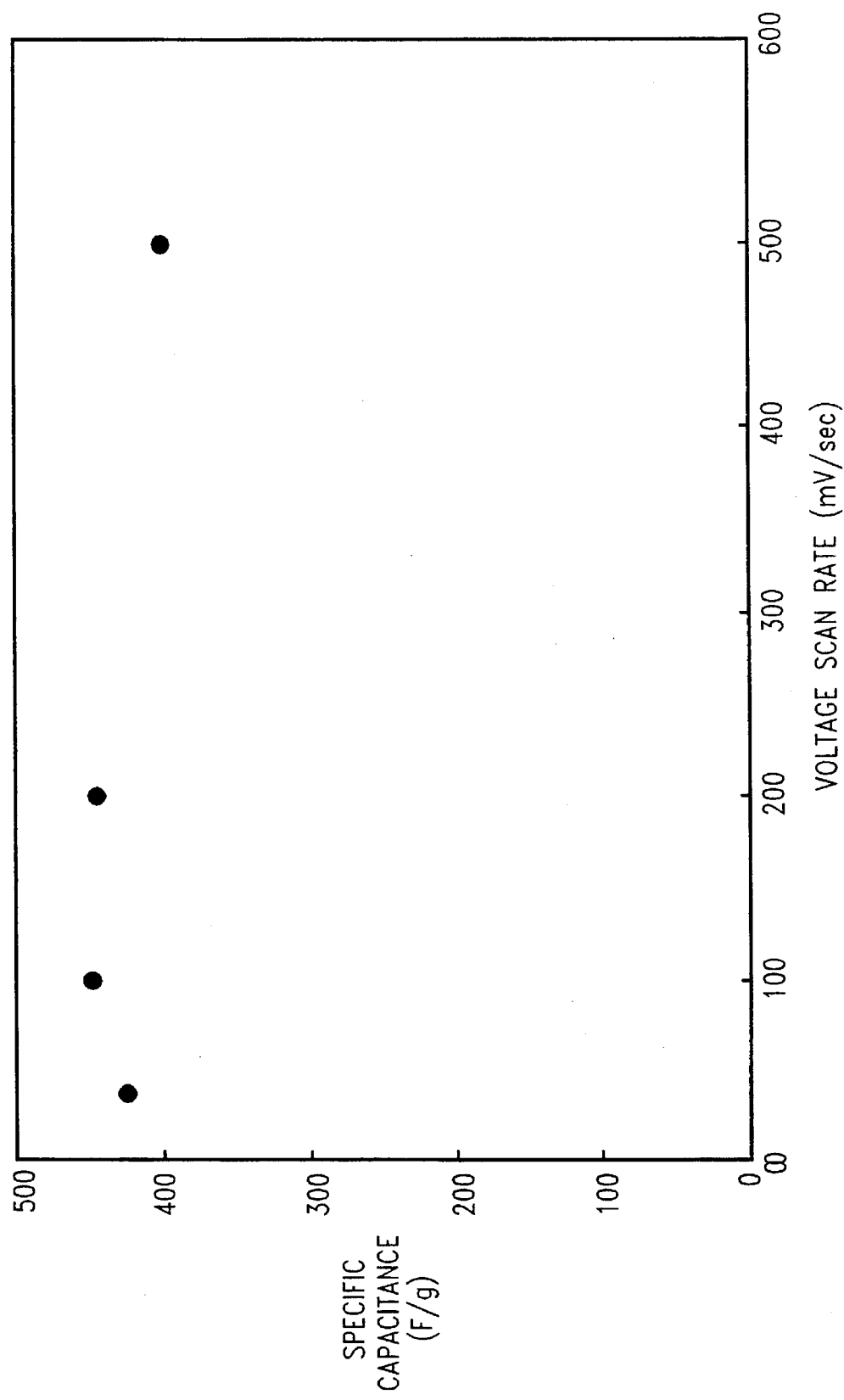
FIG. 4 is a graph of specific capacitance as a function of the voltage scan rate for a film electrode made from ruthenium ethoxide solution and annealed at 100 ° C., wherein the specific capacitance is average value from the cyclic voltammetric curves in the potential range of 0–1.0 volt verse SCE.

It was found that for amorphous film electrodes made at low temperatures, the specific capacitance is higher. When the annealing temperature was increased, the crystalline phase was formed and the specific capacitance dropped significantly. The specific capacitance as a function of the voltage scan rate in the range from 2 mV/sec to 500 mV/sec was also studied as shown in FIG. 4. At the voltage scan rate of 500 mV/sec, less than 10% drop of the specific capacitance was obtained. This result indicates that these film electrodes should be capable for high charge/discharge rate applications.

It must be noted that the film electrodes made and tested by the inventors herein were not optimized. By further improvement of impurities in the film and surface porosity of the substrate and further optimization of the pH value, the concentration of the ruthenium alkoxide solution and the annealing temperature, higher values for the specific capacitance are anticipated to be obtained from this kind of film electrodes.

Capacitor

Figure 5:
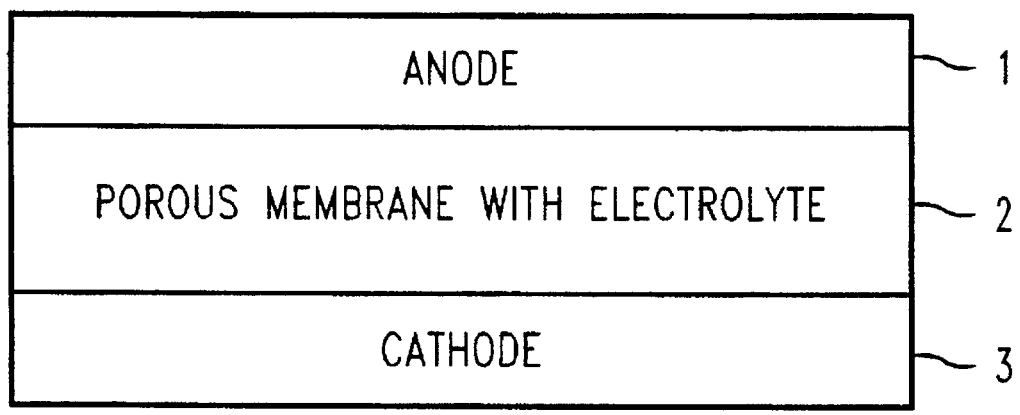
FIG. 5 is a cross-section illustration of a capacitor according to the present invention.

Now referring to FIG. 5 a capacitor 10 was built with film electrodes 1 and 3 made at 100° C. Two identical film electrodes 1 and 3 were separated by a porous membrane 2 with a thickness of 50 microns. The porous membrane 12 was pre-wetted by sulfuric acid solution (electrolyte) with a concentration of 5.3 mol. The capacitor 10 was charged/discharged at constant currents. A nearly linear voltage vs. time characteristic curve was obtained The energy density of the capacitor was estimated from the discharge curve and was about 52 J/g (or 14.5 Wh/kg) based on the active material only. This value is consistent with that obtained from the CV measurement.

The EC capacitors made of the electrode according to this invention are especially suited for commercial applications which require energy sources with high power, low voltage, and high cycle life. These applications include: 1) Pulse power applications such as burst communications and power electronic which require burst of energy of the order of 1–30 milliseconds, 2) Bridge power applications such as actuation systems and smart devices which require high power in a duration of few seconds or less, 3) Load leveling application.

Although the present invention has been described with regard to three specific embodiments as to how to manufacture the above identified material, those skilled in the art will readily recognize that other variations of manufacturing this material are available. Accordingly, the inventors do not wish to be limited by the present specification, but only by the appended claims.

What is claimed is:

1. A capacitor comprising:
   an anode comprising a first thin film of an amorphous mixed metal oxide on a first substrate, wherein the first thin film of amorphous mixed metal oxide is noncrystalline, an electrolyte; and a cathode comprising a second thin film of an amorphous mixed metal oxide on a second substrate, wherein the second thin film of amorphous mixed metal oxide is noncrystalline.

2. The capacitor of claim 1 wherein the metal of the mixed metal oxide is selected from the group comprising ruthenium, rhodium, rhenium, osmium, iridium and titanium, cobalt, tungsten, manganese, tantalum, molybdenum, lead, or nickel and the first and second substrates are metal or a carbonaeous material.

3. The capacitor of claim 2 wherein the electrolyte is selected from the group comprising acids, hydroxides, or alkaline solutions.

* * * * *